US009441697B2

(12) United States Patent
Bae et al.

(10) Patent No.: US 9,441,697 B2
(45) Date of Patent: Sep. 13, 2016

(54) BALANCING MODULE AND WASHING MACHINE HAVING THE SAME

(71) Applicant: SAMSUNG ELECTRONICS CO., LTD., Suwon-si, Gyeonggi-do (KR)

(72) Inventors: Il Sung Bae, Yongin-si (KR); Jae Seuk Park, Yongin-si (KR); Moo Hyung Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 403 days.

(21) Appl. No.: 13/911,285

(22) Filed: Jun. 6, 2013

(65) Prior Publication Data
US 2013/0327099 A1    Dec. 12, 2013

(30) Foreign Application Priority Data

Jun. 7, 2012 (KR) .......................... 10-2012-0061186
May 16, 2013 (KR) .......................... 10-2013-0055643

(51) Int. Cl.
*D06F 37/22* (2006.01)
*D06F 37/20* (2006.01)
*F16F 7/10* (2006.01)
*F16F 15/32* (2006.01)

(52) U.S. Cl.
CPC ........... *F16F 7/1011* (2013.01); *D06F 37/203* (2013.01); *D06F 37/225* (2013.01); *F16F 15/32* (2013.01); *F16F 2230/18* (2013.01); *Y10T 74/2127* (2015.01)

(58) Field of Classification Search
CPC ..... D06F 37/225; F16F 7/1011; F16F 15/32; F16F 15/36; F16F 15/363
See application file for complete search history.

(56) References Cited

U.S. PATENT DOCUMENTS

| 5,813,253 | A | 9/1998 | Uhlin |
| 6,210,099 | B1 * | 4/2001 | Hugbart ................. F16F 15/36 415/119 |

(Continued)

FOREIGN PATENT DOCUMENTS

| EP | 2 441 872 | 5/2011 |
| JP | 2005-21505 | 1/2005 |

(Continued)

OTHER PUBLICATIONS

International Search report issued Sep. 2, 2013 in corresponding Patent Application No. PCT/KR2013/005030.

(Continued)

*Primary Examiner* — Jason Ko
*Assistant Examiner* — Spencer Bell
(74) *Attorney, Agent, or Firm* — Staas & Halsey LLP

(57) ABSTRACT

A washing machine having a balancer includes a rotating basket in which laundry is accommodated, the rotating basket being configured to be rotated upon receiving rotation power from a drive source, at least one balancer housing mounted to the rotating basket, the balancer housing internally having an annular channel, and at least one balancing module movably disposed in the channel to alleviate load unbalance caused during rotation of the rotating basket. The balancing module includes a main plate, at least one mass body provided at the main plate, a drive unit mounted to the main plate to assist the balancing module in moving to a position where the balancing module alleviates load unbalance of the rotating basket, and a brush configured to transmit electric power supplied from an external power source to the drive unit.

19 Claims, 20 Drawing Sheets

(56) References Cited

U.S. PATENT DOCUMENTS

| | | | |
|---|---|---|---|
| 2004/0195767 A1* | 10/2004 | Randall | A63F 3/00643 273/237 |
| 2012/0084926 A1 | 4/2012 | Lee et al. | |
| 2012/0192362 A1* | 8/2012 | Lee | D06F 37/203 8/137 |

FOREIGN PATENT DOCUMENTS

| | | |
|---|---|---|
| KR | 10-2011-0010945 | 2/2011 |
| WO | WO 2010/133480 | 11/2010 |
| WO | WO 2011/115384 | 9/2011 |

OTHER PUBLICATIONS

Extended European Search Report issued Oct. 7, 2013 in corresponding European Application No. 13 17 0891.
Australian Decision on Grant dated Mar. 8, 2016 from corresponding Australian Patent Application No. 2013272387, 2 pages.
European Decision on Grant dated Feb. 26, 2016 from corresponding European Patent Application No. 14195540.1, 54 pages.

* cited by examiner

BALANCING MODULE AND WASHING MACHINE HAVING THE SAME

CROSS-REFERENCE TO RELATED APPLICATIONS

This application claims the benefit of Korean Patent Application Nos. 10-2012-0061186, filed on Jun. 7, 2012, and 10-2013-0055643, filed on May 16, 2013 in the Korean Intellectual Property Office, the disclosures of which are incorporated herein by reference.

BACKGROUND

1. Field

Embodiments of the present disclosure relate to a washing machine having a balancer to alleviate load unbalance.

2. Description of the Related Art

A washing machine is a machine that washes laundry using electric power. In general, a washing machine includes a tub in which wash water is stored, a rotating basket rotatably installed in the tub, and a motor to rotate the rotating basket.

Through rotation of the rotating basket, a series of washing stages including washing, rinsing, and dehydration are performed.

If laundry becomes concentrated in a certain region rather than being uniformly distributed in the rotating basket during rotation of the rotating basket, eccentric rotation of the rotating basket may cause generation of vibration and noise, and worse, may cause damage to components, such as the rotating basket or the motor.

For this reason, the washing machine includes a balancer to stabilize rotation of the rotating basket by alleviating load unbalance within the rotating basket.

Conventionally, the balancer is configured to passively move and has difficulty in moving to an accurate position to remove an unbalanced load of the rotating basket, which prevents minimization of vibration and noise.

SUMMARY

It is an aspect of the present disclosure to provide a balancing module exhibiting improved performance and a washing machine having the same.

Additional aspects of the disclosure will be set forth in part in the description which follows and, in part, will be apparent from the description, or may be learned by practice of the disclosure.

In accordance with one aspect of the disclosure, a washing machine includes a rotating basket in which laundry is accommodated, the rotating basket being configured to be rotated upon receiving rotation power from a drive source, at least one balancer housing mounted to the rotating basket, the balancer housing internally having an annular channel, and at least one balancing module movably disposed in the channel to alleviate load unbalance caused during rotation of the rotating basket, wherein the balancing module includes a main plate, at least one mass body provided at the main plate, a drive unit mounted to the main plate to assist the balancing module in moving to a position where the balancing module alleviates load unbalance of the rotating basket, and a brush configured to transmit electric power supplied from an external power source to the drive unit.

The balancer housing may include at least one electrode provided in a circumferential direction of the balancer housing to transmit electric power to the at least one balancing module.

The brush may be placed to come into contact with the at least one electrode.

The balancing module may further include bearings mounted at both ends of the main plate.

Each of the bearings may be provided at one surface thereof with at least one contact ridge configured to come into contact with the bearing housing and at least one valley indented toward the center of the bearing as compared to the ridge.

The main plate may be bent so as to freely move within the annular channel.

The main plate may include a center plate, and a first lateral plate and a second lateral plate provided at both sides of the center plate so as to be bent relative to the center plate, the first and second lateral plates having a predetermined angle with respect to the center plate.

The drive unit may include a drive motor to generate drive power, and a drive wheel to be rotated by drive power of the drive motor so as to enable movement of the balancing module.

The drive unit may further include at least one gear configured to transmit drive power of the drive motor to the drive wheel.

The at least one gear may include a worm gear.

The at least one gear may include a helical gear.

The washing machine may further include a position sensor configured to sense a position of the balancing module.

The balancing module may further include a position identifier configured to be sensed by the position sensor.

The balancer housing may include a first housing having an opening, an outer sidewall, an inner sidewall arranged to face the outer sidewall at a position closer to a rotation axis of the rotating basket than the outer sidewall, and a connection wall connecting the outer sidewall and the inner sidewall to each other, the connection wall being located closer to the center of the rotating basket than the opening, and a second housing inserted into the opening of the first housing so as to define the annular channel along with the first housing.

The washing machine may further include at least one electrode provided in a circumferential direction of the balancer housing to transmit electric power to the balancing module, and the at least one electrode may be provided at an inner surface of the connection wall of the first housing.

The main plate may include a center plate provided with the drive unit, and a plurality of lateral plates provided at both sides of the center plate, each of the lateral plates being provided with the mass body and a bearing to prevent slip of the balancing module, and the lateral plates may be bent relative to the center plate and have a predetermined angle with respect to the center plate.

The drive unit may include a drive motor to generate drive power and a drive wheel to be rotated by drive power of the drive motor, and the drive wheel may come into contact with the outer sidewall of the first housing.

The main plate may be elastically deformable such that the angle between the center plate and the lateral plates varies.

The main plate may be elastically deformed such that the angle between the center plate and the lateral plates is increased by centrifugal force applied to the mass body of each lateral plate during rotation of the rotating basket, and may be returned when the rotating basket stops rotating.

The bearing may come into contact with the inner sidewall of the first housing, may come into contact with the outer sidewall of the first housing, or may be spaced apart from the inner sidewall and the outer sidewall according to a rate of rotation of the rotating basket.

The bearing may come into contact with the inner sidewall of the first housing when the rotating basket stops rotating or is rotated at a low speed.

The bearing may be spaced apart from the inner sidewall and the outer sidewall of the first housing when the rotating basket is rotated at a middle speed.

The bearing may come into contact with the outer sidewall of the first housing when the rotating basket is rotated at a high speed.

In accordance with another aspect of the disclosure, a washing machine includes a rotating basket, and a balancer configured to alleviate load unbalance of the rotating basket, wherein the balancer includes at least one balancer housing mounted to the rotating basket, and at least one balancing module disposed to be movable within the balancer housing, wherein the balancer housing includes an electrode configured to transmit external electric power to the at least one balancing module that is being moved within the balancer housing, and wherein the balancing module includes a drive unit to enable movement of the balancing module, and a brush configured to electrically connect the electrode and the drive unit to each other to enable actuation of the drive unit.

The electrode may be disposed in a circumferential direction of the balancer housing, and the brush may be disposed to come into contact at one side thereof with the electrode.

In accordance with another aspect of the disclosure, a balancing module configured to alleviate load unbalance caused during rotation of a rotating basket, includes a main plate, at least one mass body provided at the main plate to compensate unbalanced load of the rotating basket, a drive unit to assist the balancing module in alleviating load unbalance of the rotating basket via movement thereof, and a brush configured to transmit electric power of an external power source to the drive unit.

The main plate may include a center plate, and lateral plates provided at both sides of the center plate so as to be bent relative to the center plate, the lateral plates having a predetermined angle with respect to the center plate.

The angle between the lateral plates and the center plate may be increased to spread the main plate when the balancing module is rotated at a high speed.

In accordance with another aspect of the disclosure, a balancing module configured to alleviate load unbalance caused during rotation of a rotating basket includes a drive wheel to enable movement of the balancing module, a drive motor configured to generate drive power for driving of the drive wheel, and a brush configured to transmit electric power of an external power source to the drive motor.

The balancing module may further include at least one gear configured to transmit drive power of the drive motor to the drive wheel.

The at least one gear may include at least one of a worm gear and a helical gear.

In accordance with a further aspect of the disclosure, a washing machine includes a rotating basket in which laundry is accommodated, the rotating basket being configured to be rotated upon receiving rotation power from a drive source, at least one balancer housing mounted to the rotating basket, the balancer housing internally having an annular channel, and at least one balancing module movably disposed in the channel to alleviate load unbalance caused during rotation of the rotating basket, wherein the balancer housing includes a first housing having an opening, an outer sidewall, an inner sidewall arranged to face the outer sidewall at a position closer to a rotation axis of the rotating basket than the outer sidewall, and a connection wall connecting the outer sidewall and the inner sidewall to each other, the connection wall being located closer to the center of the rotating basket than the opening, and a second housing inserted into the opening of the first housing so as to define the annular channel along with the first housing, and wherein the balancing module includes a center plate provided with a drive unit to move the balancing module upon receiving electric power from an external power source, and a plurality of lateral plates provided at both sides of the center plate so as to be bent relative to the center plate, each lateral plate being provided with a mass body to offset load of the rotating basket and a bearing to prevent slip of the balancing module.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, the embodiments of the present disclosure will be described in detail with reference to the accompanying drawings.

Figure 1:
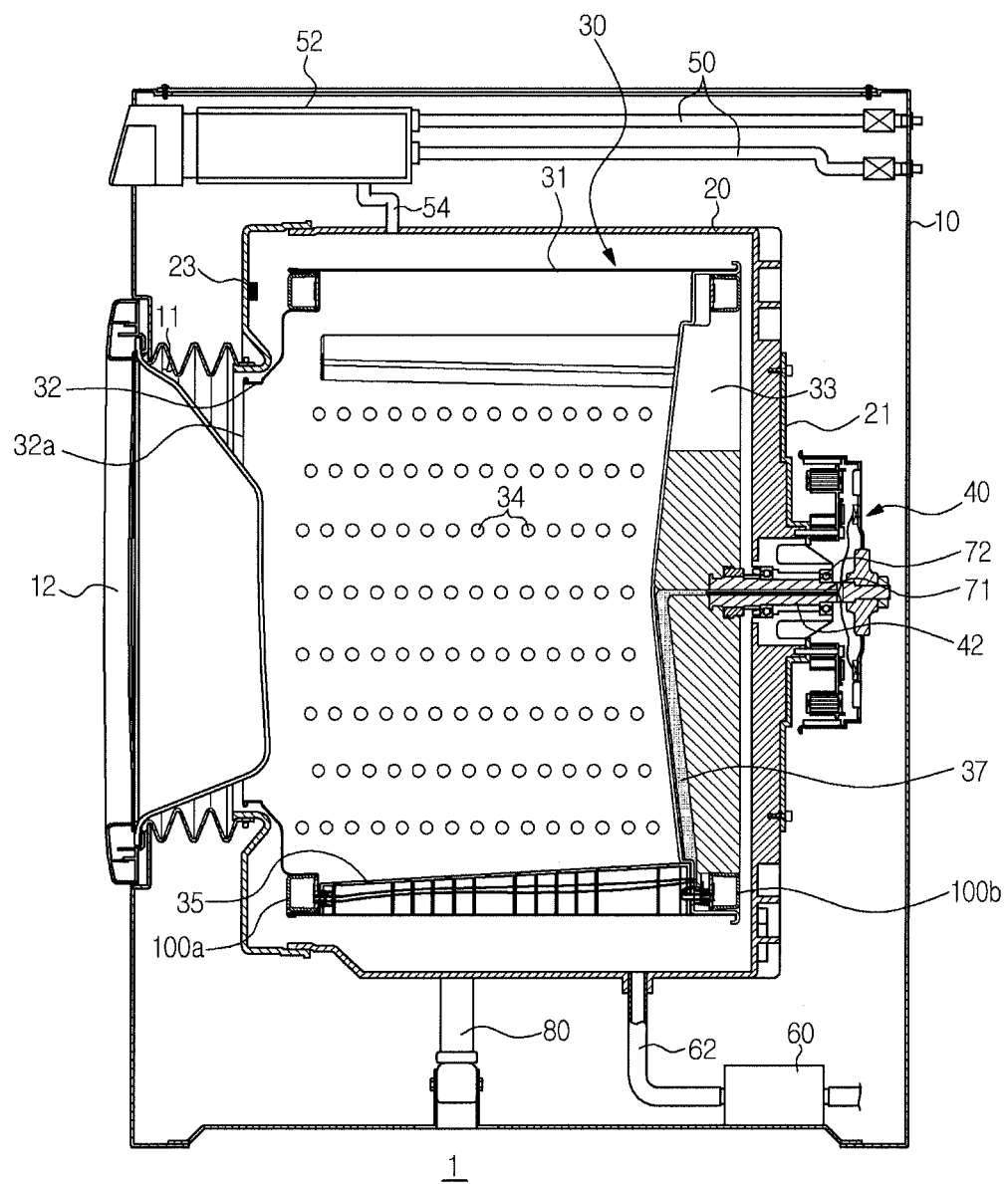
FIG. 1 is a view showing a configuration of a washing machine according to one embodiment of the present disclosure.

FIG. 1 is a view showing a configuration of a washing machine according to one embodiment of the present disclosure.

As exemplarily shown in FIG. 1, the washing machine 1 includes a cabinet 10 defining an external appearance of the washing machine 1, a tub 20 disposed within the cabinet 10, a rotating basket 30 rotatably disposed within the tub 20, and a motor 40 to drive the rotating basket 30. According to embodiments, the tub 20 may be integrally formed with the cabinet 10, or the tub 20 may be omitted.

The cabinet 10 has an opening 11 formed in a front surface thereof, through which laundry may be input into the rotating basket 30. The opening 11 is opened or closed by a door 12 that is coupled to the front surface of the cabinet 10.

A water supply pipe 50 is installed above the tub 20 to supply wash water into the tub 20. One end of the water supply pipe 50 is connected to an external water supply source (not shown), and the other end of the water supply pipe 50 is connected to a detergent supply device 52.

The detergent supply device 52 is connected to the tub 20 through a connection pipe 54. Water supplied through the water supply pipe 50 passes through the water supply device 52, such that both water and detergent are introduced into the tub 20.

A water drain pump 60 and a water drain pipe 62 are installed below the tub 20 to discharge water inside the tub 20 to the outside of the cabinet 10. In addition, a damper 80 is provided to support the tub 20 from a lower portion of the tub 20.

The rotating basket 30 includes a cylindrical body 31, a front plate 32 placed at the front side of the cylindrical body 31, and a rear plate 33 placed at the rear side of the cylindrical body 31. The front plate 32 has an aperture 32a for entrance/exit of laundry.

A plurality of through-holes 34 is formed in the circumference of the rotating basket 30 for movement of wash water. A plurality of lifters 35 is provided at an inner circumferential surface of the rotating basket 30 to raise and drop laundry during rotation of the rotating basket 30.

A drive shaft 42 is arranged between the rotating basket 30 and the motor 40. One end of the drive shaft 42 is connected to the rear plate 33 of the rotating basket 30 and the other end of the drive shaft 42 extends outward of a rear wall of the tub 20. If the motor 40 rotates the drive shaft 42, the rotating basket 30 connected to the drive shaft 42 is rotated about the drive shaft 42.

A bearing housing 70 is mounted to the rear wall of the tub 20 to rotatably support the drive shaft 42. The bearing housing 70 may be made of an aluminum alloy, and may be inserted into the rear wall of the tub 20 during injection molding of the tub 20. Bearings 72 are interposed between the bearing housing 70 and the drive shaft 42, to assure smooth rotation of the drive shaft 42.

In a washing stroke, as the motor 40 rotates the rotating basket 30 forward and in reverse at a low speed, laundry inside the rotating basket 30 is repeatedly raised and dropped, causing removal of contaminants from the laundry.

In a dehydration stroke, as the motor 40 rotates the rotating basket 30 in a given direction at a high speed, water is separated from laundry by centrifugal force applied to the laundry.

If laundry becomes concentrated in a certain region rather than being uniformly distributed in the rotating basket 30 while the rotating basket 30 is rotated in the course of dehydration, rotation of the rotating basket 30 becomes unstable, causing generation of vibration and noise.

Accordingly, the washing machine 1 includes a balancer 100 to stabilize rotation of the rotating basket 30.

Figure 2:
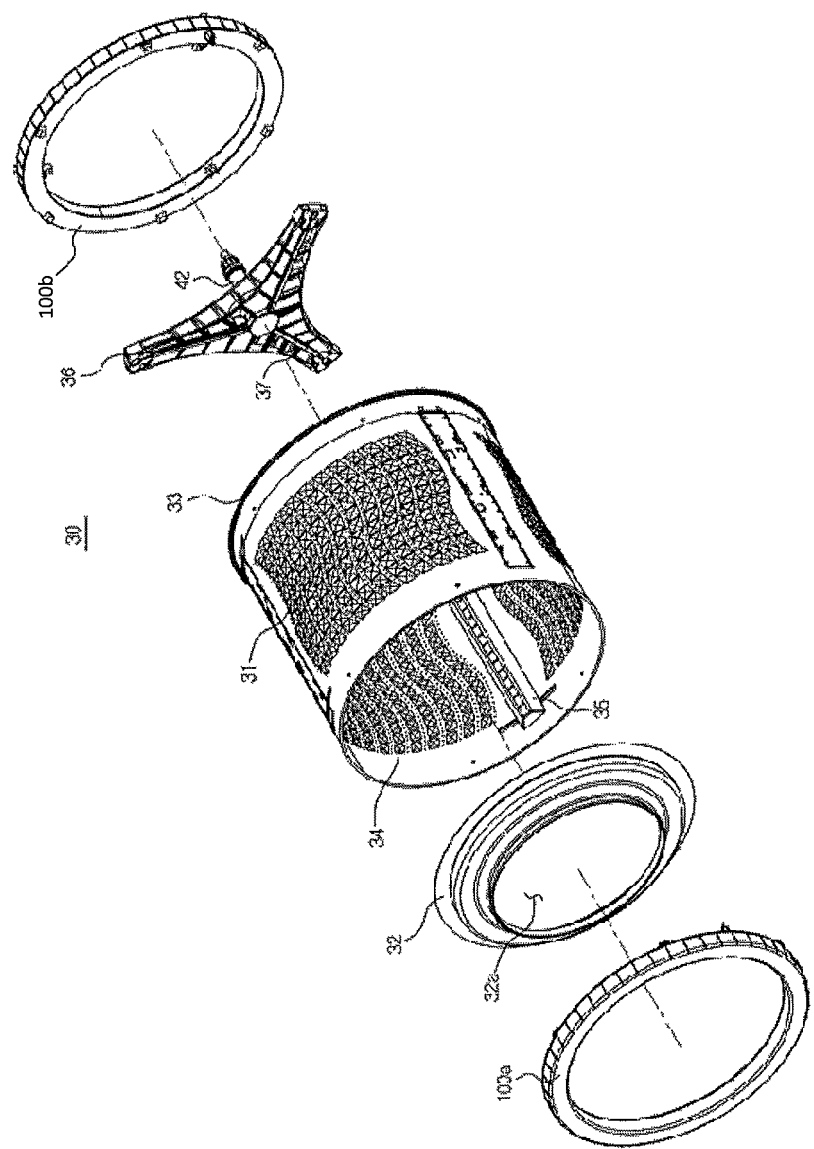
FIG. 2 is a perspective view showing a configuration of a rotating basket provided in the washing machine of FIG. 1.

FIG. 2 is a perspective view showing a configuration of the rotating basket provided in the washing machine of FIG. 1.

As exemplarily shown in FIG. 2, the rotating basket 30 includes the cylindrical body 31, the front plate 32 placed at the front side of the cylindrical body 31, and the rear plate 33 placed at the rear side of the cylindrical body 31. The front plate 32 has the aperture 32a for entrance/exit of laundry.

The front plate 32 may have a forwardly protruding stepped portion, and a front balancer 100a may be mounted to the stepped portion.

The rear plate 33 is placed at the rear side of the cylindrical body 31 and is configured to cover the rear side of the cylindrical body 31. A flange 36 may be attached to a rear surface of the rear plate 33 and may be coupled to the drive shaft 42.

The drive shaft 42 may be fitted to the center of the flange 36. The flange 36 may have guide portions 37 for passage of electric wires 121 and 122. This configuration will be described later in detail.

A rear balancer 100b may be mounted to a rear surface of the flange 36.

The lifters 35 may be installed to an inner circumferential surface of the cylindrical body 31 of the rotating basket 30.

The cylindrical body 31 of the rotating basket 30 may be provided with the plurality of through-holes 34 for communication between inside and outside of the rotating basket 30.

Figure 3:
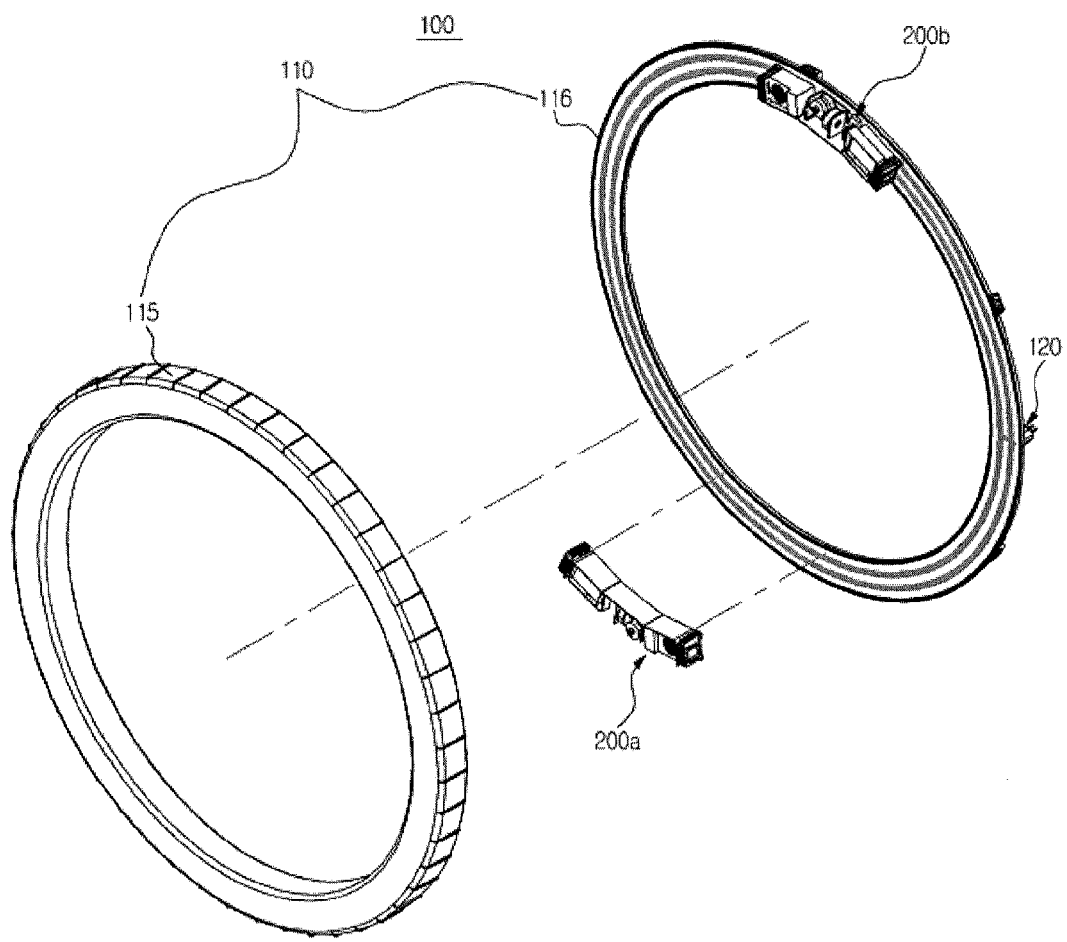
FIG. 3 is a view showing a balancer according to one embodiment of the present disclosure.

FIG. 3 is a view showing the balancer according to one embodiment of the present disclosure.

As exemplarily shown in FIG. 3, the balancer 100 may include a balancer housing 110, and balancing modules 200a and 200b disposed within the balancer housing 110.

Although the present embodiment shows the balancer 100 including total two balancing modules 200a and 200b, the number of the balancing modules 200 may be less than or greater than two.

The balancer housing 110 may include an annular housing body 115, one side of which is open, and a housing cover 116 configured to cover the open side of the housing body 115.

Electrodes 111 and 112 may be attached to an inner surface of the housing cover 116 to transmit power of an external power source to each balancing module 200. The electrodes 111 and 112 may include a positive electrode 111 and a negative electrode 112.

The electrodes 111 and 112 are circumferentially formed throughout the annular housing cover 116 to continuously supply power to the balancing module 200 even if the balancing module 200 moves inside the balancing housing 110 and varies in position.

Although the electrodes 111 and 112 of the present embodiment are provided at the housing cover 116, providing the electrodes 111 and 112 at another surface of the balancer housing 110 is within the scope of the embodiments of the present disclosure.

A connector to electrically connect the electrodes 111 and 112 to the external power source (not shown) may be provided at an outer surface of the housing cover 116 of the balancer housing 110.

Figure 4:
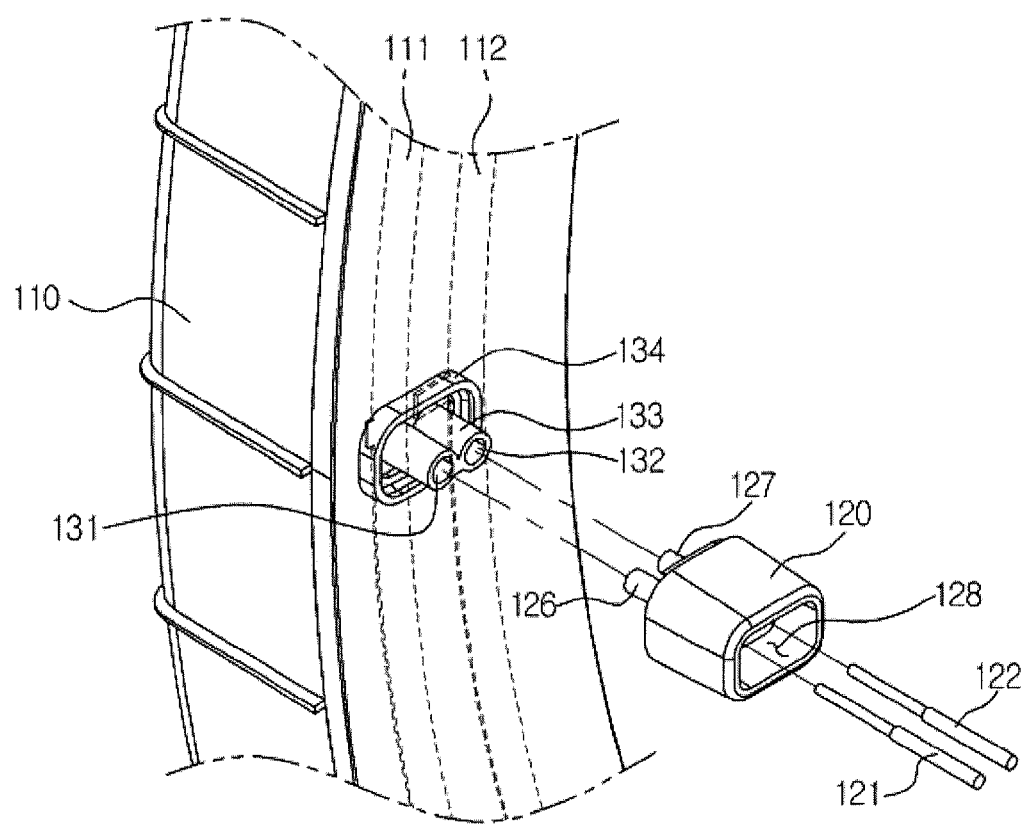
FIGS. 4 and 5 are views showing a connector and a balancer housing of FIG. 2.
Figure 5:
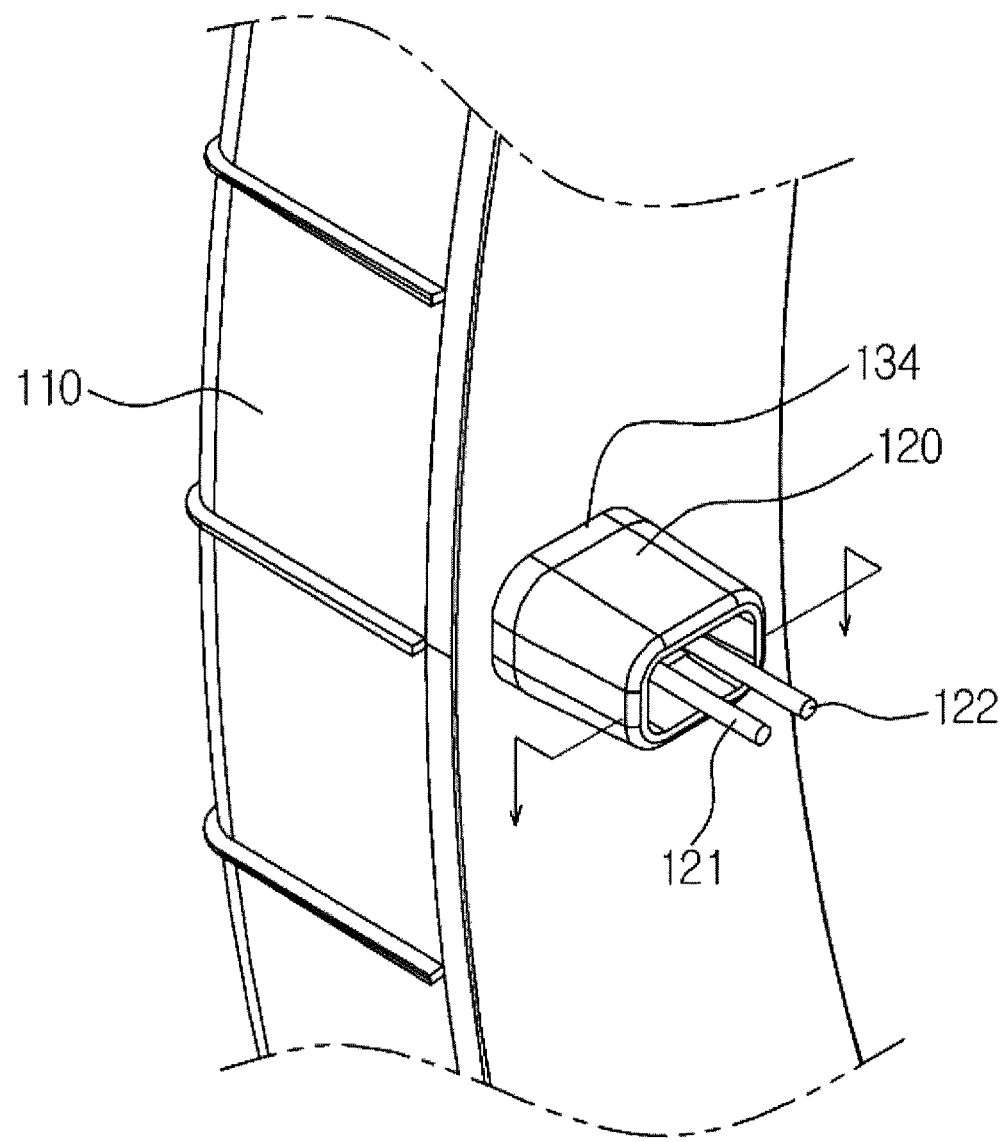
Figure 6:
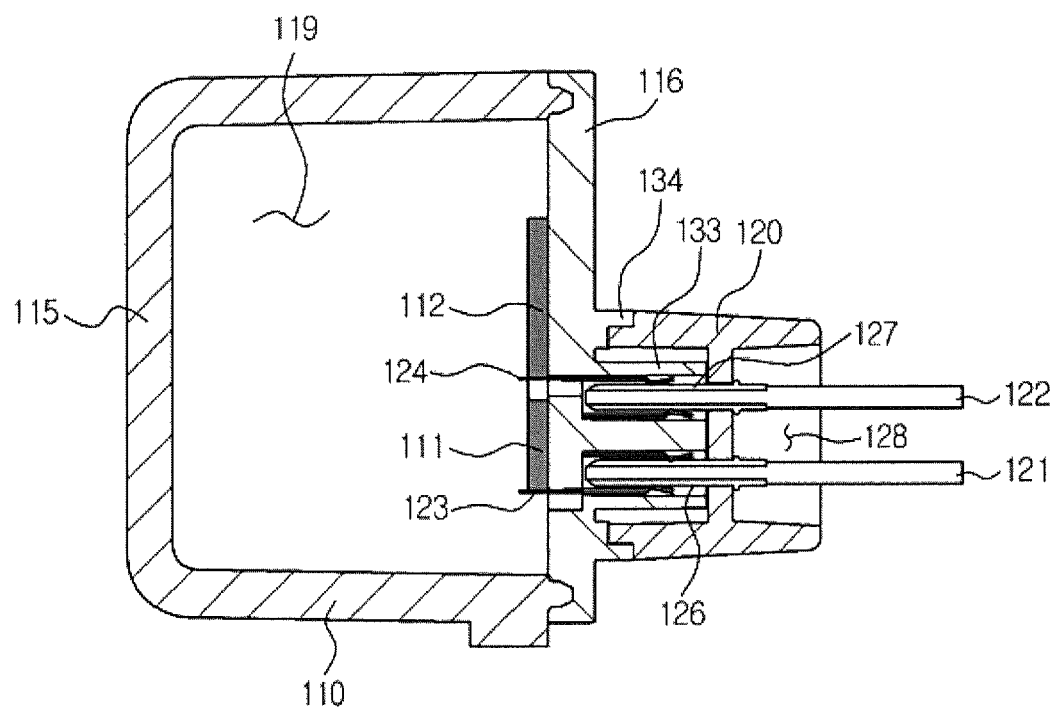
FIG. 6 is a sectional view taken along a cut line of FIG. 4.

FIGS. 4 and 5 are views showing the balancer housing of FIG. 2 and the connector, and FIG. 6 is a sectional view taken along a cut line of FIG. 4.

As exemplarily shown in FIGS. 4 to 6, the connector may be provided at the outer surface of the housing cover 116 of the balancer housing 110.

The connector may include a plug 120 and a socket 133.

The plug 120 functions to secure electric wires 121 and 122 so as to easily connect the electric wires 121 and 122 to the balancer housing 110. Here, the electric wires 121 and 122 serve to electrically connect the external power source (not shown) to the balancer housing 110. On the other hand, the socket 133 is provided at the balancer housing 110 and functions to easily connect and couple the balancer housing 110 and the plug 120 to each other.

The plug 120 is configured such that electric wire terminals 126 and 127 may be inserted into the plug 120, and in turn the electric wires 121 and 122 may be fixedly fitted into the electric wire terminals 126 and 127. In addition to fixing the electric wires 121 and 122, the electric wire terminals 126 and 127 function to assist the flexible electric wires 121 and 122 in being easily inserted into and fixed to the socket 133.

The electric wire terminals 126 and 127 may protrude from one side of the plug 120. As described above, the positive and negative electrodes 111 and 112 are provided, and thus the two electric wires 121 and 122 are provided so as to be respectively connected to the electrodes 111 and 112.

The socket 133 may protrude from the outer surface of the housing cover 116 of the balancer housing 110. Providing the socket 133 at another surface of the balancer housing 110 may be within the scope of the embodiments of the present disclosure.

The socket 133 has socket holes 131 and 132 such that the electric wire terminals 126 and 127 may be inserted into and fixed to the socket holes 131 and 132. That is, the entire socket 133 may have a hollow shape. The two socket holes 131 and 132 may be positive and negative respectively.

Electrode terminals 123 and 124 are provided inside the socket holes 131 and 132. The electrode terminals 123 and 124 electrically connect the electrodes 111 and 112 to the electric wire terminals 126 and 127 to which the electric wires 121 and 122 are connected. As such, the respective electric wires 121 and 122 may be connected to the electrodes 111 and 112 having corresponding polarities by the electrode terminals 123 and 124.

The housing cover 116 of the balancer housing 110 may have a raised portion 134 around the socket 133. The raised portion 134 may have the same size as an outer surface of the plug 120. That is, when the plug 120 is fitted into the socket 133, an outer surface of the raised portion 134 may be flush with the outer surface of the plug 120.

Considering an assembly procedure of the connector, first, the electric wire terminals 126 and 127 are connected to ends of the electric wires 121 and 122. Then, the electric wires 121 and 122, to which the electric wire terminals 126 and 127 have been connected, are inserted into the plug 120, and in turn the plug 120 is inserted into the socket 133. In this way, the electric wires 121 and 122 and the electrodes 111 and 112 may be electrically connected to each other.

The outer surface of the balancer housing 110 is accommodated inside the tub (20, see FIG. 1) and may be continuously exposed to wash water. Thus, a waterproof structure enclosing the aforementioned electrical structure may be necessary.

The plug 120 has a waterproof recess 128 indented in one side thereof. The waterproof recess 128 is formed in one side of the plug 120 opposite to the other side to which the socket 133 is coupled.

The electric wires 121 and 122, to which the electric wires 126 and 127 have been connected, are inserted into and fixed to the waterproof recess 128. As the waterproof recess 128 is filled with epoxy resin, the plug 120 may be made waterproof.

Waterproofing treatment may be necessary even at a coupling region of the socket 133, the raised portion 134, and the plug 120. These components may need to be waterproofed as well as to be coupled to one another. Therefore, it may be necessary not only to couple the raised portion 134 and the plug 120 to each other via ultrasonic fusion, but also to prevent wash water from entering the plug 120.

Other methods to achieve such a waterproof structure except for the aforementioned epoxy resin filling and ultrasonic fusion may be within the scope of the embodiments of the present disclosure.

Figure 7:
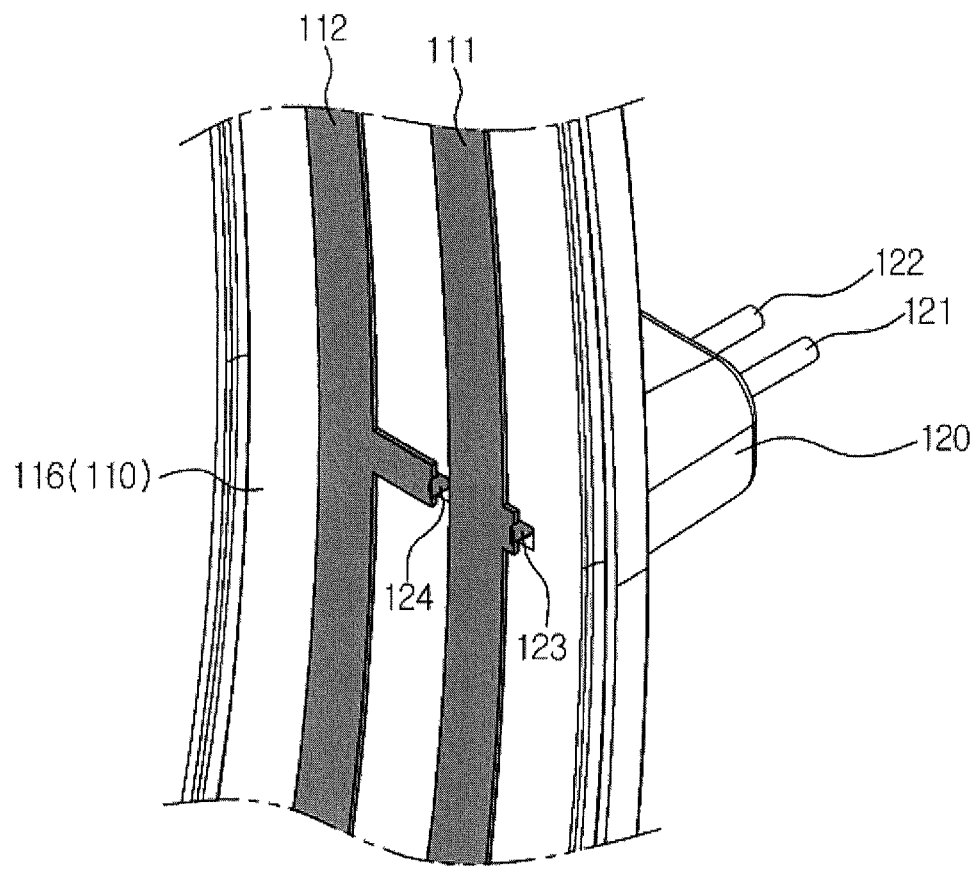
FIG. 7 is a view showing the balancer housing and electrodes of FIG. 2.

FIG. 7 is a view showing the balancer housing and the electrodes of FIG. 2.

As exemplarily shown in FIG. 7, if the width of the electrodes 111 and 112 is different from the width of the connector, the electrodes 111 and 112 may partially protrude and come into contact with the electrode terminals 123 and 124.

Figure 8:
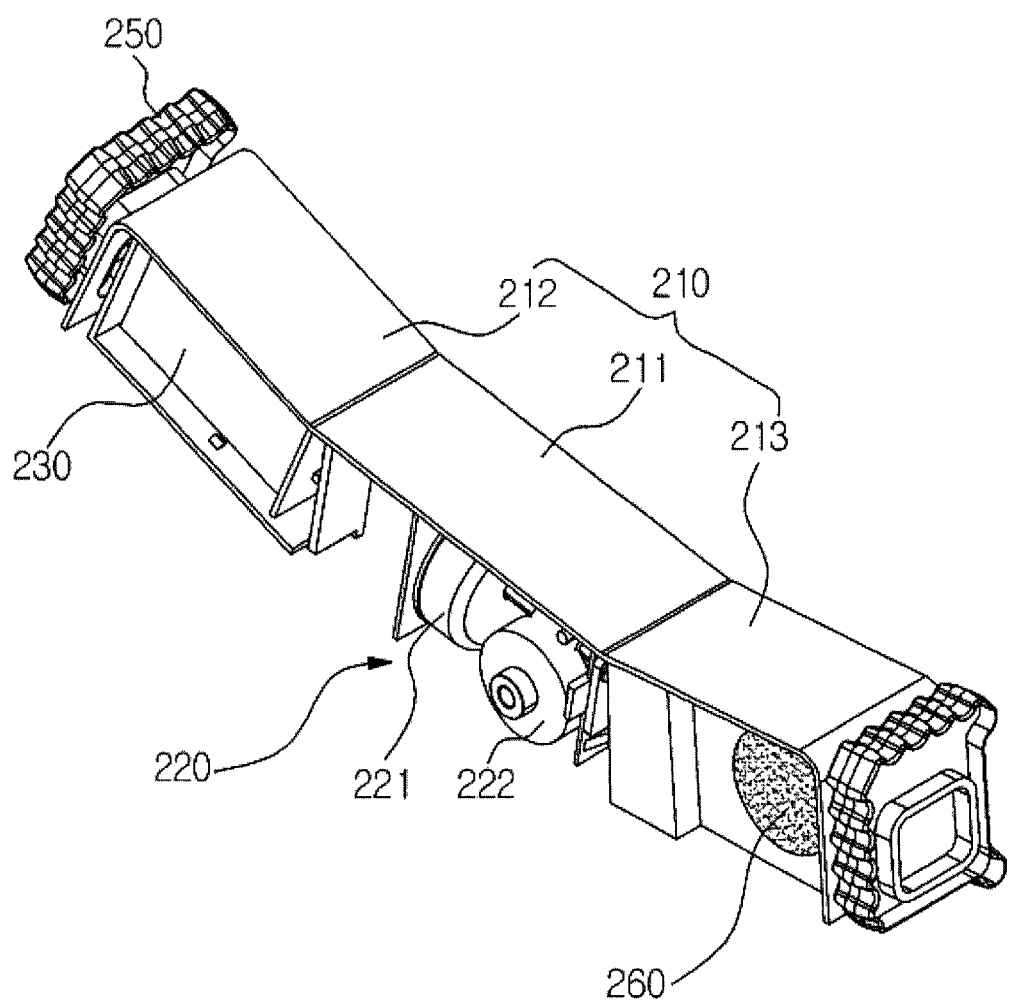
FIG. 8 is a view showing a balancing module according to one embodiment of the present disclosure.
Figure 9:
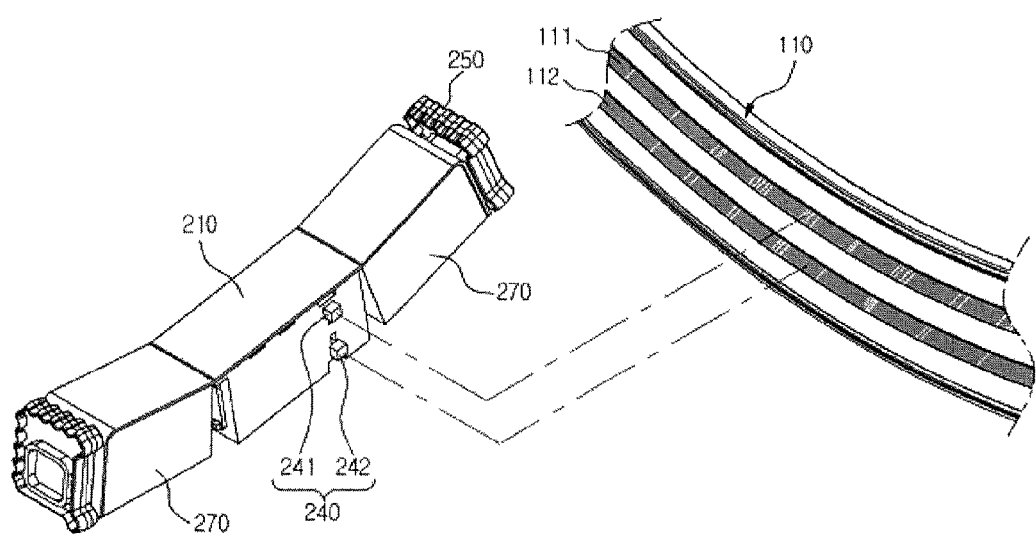
FIG. 9 is a view showing the balancing module and the balancer housing according to one embodiment of the present disclosure.

FIG. 8 is a view showing the balancing module according to one embodiment of the present disclosure, and FIG. 9 is a view showing the balancing module and the balancer housing according to one embodiment of the present disclosure.

Hereinafter, the balancing module, which is accommodated in an annular channel (119, see FIG. 6) defined in the balancer housing (110, see FIG. 3), will be described.

As exemplarily shown in FIGS. 8 and 9, the balancing module 200 may include a main plate 210 that defines a basic shape of the balancing module 200.

The main plate 210 may include a center plate 211, and lateral plates 212 and 213 located at both sides of the center plate 211 so as to be bent relative to the center plate 211, the lateral plates 212 and 213 having a predetermined angle with respect to the center plate 211. As the lateral plates 212 and 213 provided at both sides of the center plate 211 have a predetermined angle with respect to the center plate 211, the balancing module 200 may be easily moved inside the annular channel (119, see FIG. 6).

A pair of mass bodies 270 may be mounted to the respective lateral plates 212 and 213. The mass bodies 270 compensate unbalanced load caused when laundry within the rotating basket (30, see FIG. 1) becomes concentrated in one side so as to alleviate load unbalance, thereby assisting efficient rotation of the rotating basket 30.

One of the mass bodies 270 may be provided at a front surface thereof with a circuit board 230. A variety of devices for actuation of a drive unit 220 that will be described hereinafter are mounted on the circuit board 230.

One of the mass bodies 270 may be provided with a position identifier 260. The position identifier 260 may include a magnetic substance, such as a permanent magnet, a light emitting element to emit light, or a reflector to reflect light incident thereon.

The tub (20, see FIG. 1) may include a position sensor (23, see FIG. 1) installed at a position corresponding to the balancer housing (110, see FIG. 3). The position sensor 23 may sense a position of the balancing module 200 that is being moved, thereby determining a current position of the balancing module 200. The position sensor 23 may include a hall sensor, an infrared sensor, or an optical fiber sensor. If the position sensor 23 is a hall sensor, the position identifier may be a magnetic substance. If the position sensor 23 is an infrared sensor, the position identifier may be a light emitting element. In addition, if the position sensor 23 is an optical fiber sensor, the position identifier may be a reflector.

A bearing 250 may be coupled to an end of each lateral plate 212 or 213. The bearing 250 serves to prevent the balancing module 200 from colliding with an inner surface of the balancer housing 110. In addition, the bearing 250 serves to restrict excessively free movement of the balancing module 200 within the balancer housing 110, thereby assisting the balancing module 200 in being fixed at an accurate position to alleviate unbalanced load. This will hereinafter be described with reference to FIG. 11.

The drive unit 220 may be mounted to the center plate 211.

The drive unit 220 may include drive wheels 222 to enable self-movement of the balancing module 200, and a drive motor 221 to rotate the drive wheels 222. This will hereinafter be described with reference to FIG. 10.

Brushes 240 may be provided behind the drive unit 220. The brushes 240 come into physical contact with the electrodes 111 and 112 of the balancer housing 110 to thereby be electrically connected to the electrodes 111 and 112. The brushes 240 continuously come into contact with the electrodes 111 and 112 even if the balancing module 200 is moved, thereby ensuring continuous supply of power to the balancing module 200, more particularly, to the drive unit 220.

To correspond to the positive and negative electrodes 111 and 112, two brushes 241 and 242 may be provided. Likewise, the two brushes 241 and 242 may be arranged to come into contact with the respective electrodes 111 and 112.

The brushes 240 come into contact with the electrodes 111 and 112 within the rotating basket (30, see FIG. 1) that undergoes rotation and vibration and may be damaged. Therefore, an inner end of each brush 240 may be supported by an elastic member.

Figure 10:
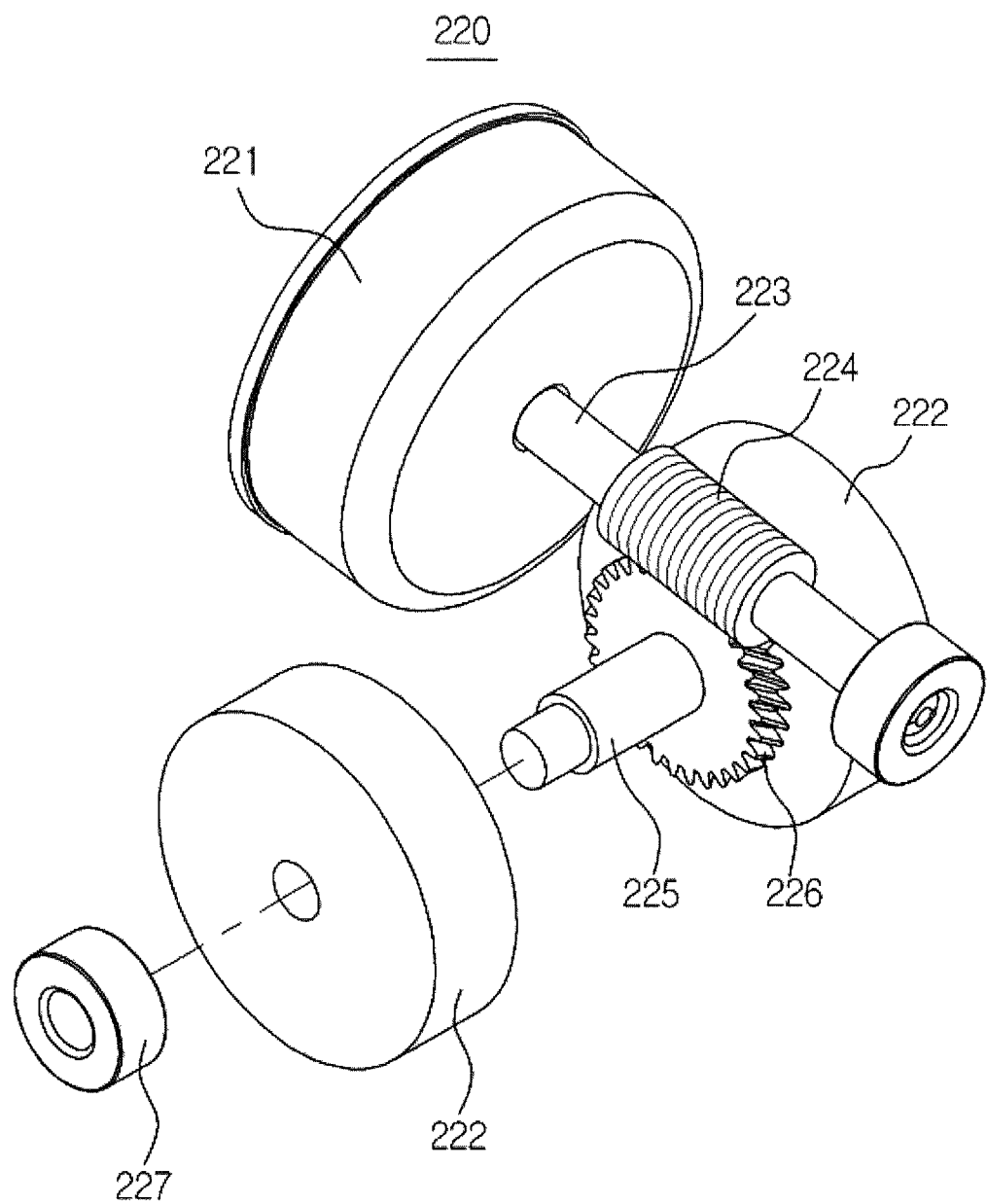
FIG. 10 is a view showing a drive unit of FIG. 8.

FIG. 10 is a view showing the drive unit of FIG. 8.

As exemplarily shown in FIG. 10, the drive unit 200 may include the drive wheels 222 to enable movement of the balancing module 200, and the drive motor 221 to rotate the drive wheels 222.

Gears 224 and 226 may be arranged between the drive motor 221 and the drive wheels 222 to transmit power of the drive motor 221 to the drive wheels 222.

In the present embodiment, the drive motor 221 and the drive wheels 222 are arranged perpendicular to each other, and a first gear 224 and a second gear 226 are provided to transmit power of the drive motor 221 to the drive wheels 222. That is, the first gear 224 and the second gear 226 may be worm gears.

The first gear 224 may be installed on a drive shaft 223 of the drive motor 221.

The second gear 226 may be rotatably engaged with the first gear 224. A rotating shaft 225 is provided at the center of the second gear 226, and the drive wheels 222 are installed at both ends of the rotating shaft 225. A wheel cap 227 secures each wheel 222 to the rotation shaft 225.

The first gear 224 and the second gear 226 may be helical gears. The helical gear is a gear wheel whose teeth are helically formed.

The first gear 224 and the second gear 226 in the form of helical gears may restrict movement of the drive wheels 222 even if the drive motor 221 is not actuated. Accordingly, even if power is not supplied from an external power source (not shown), the balancing module 200 may be fixed at a final position without movement.

Figure 11:
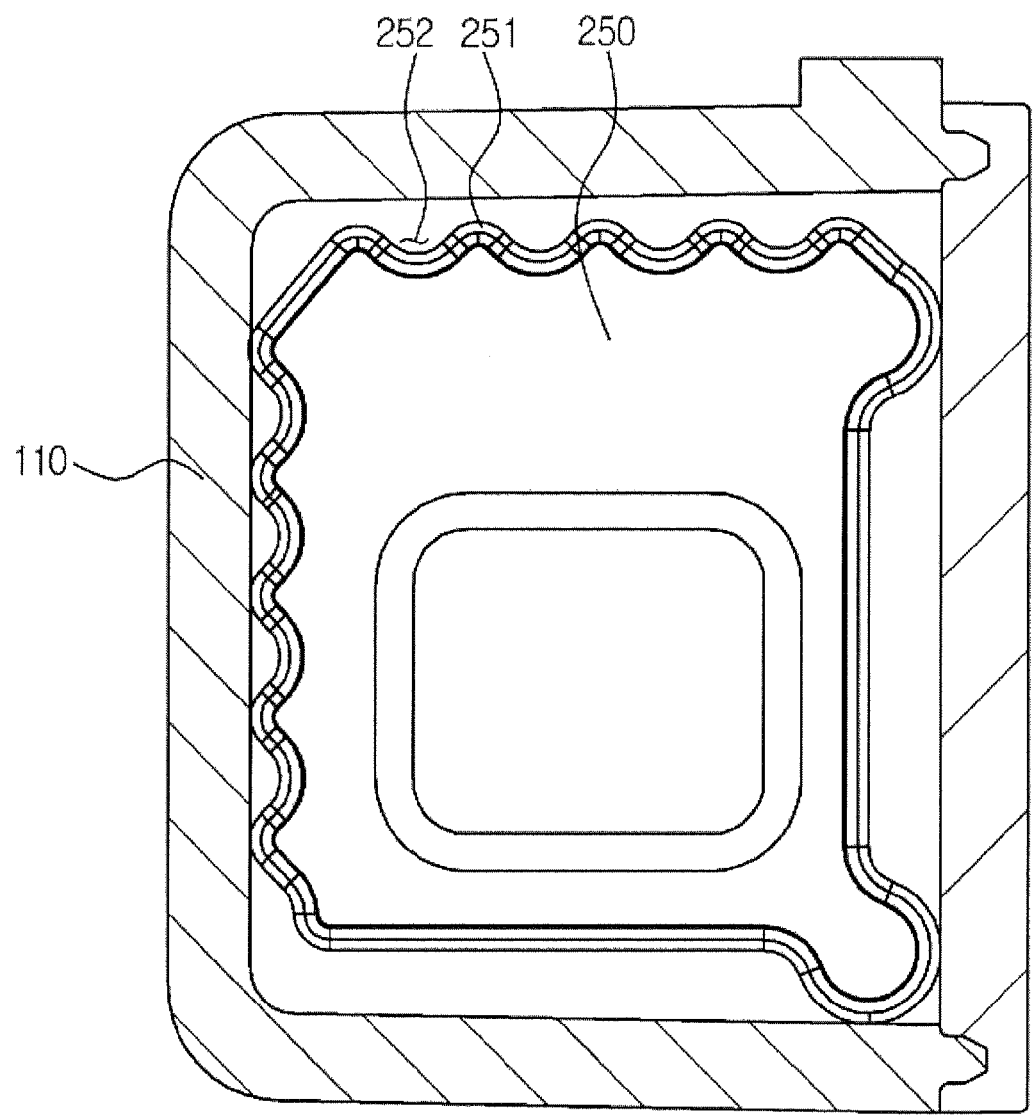
FIG. 11 is a view showing the balancer housing and a bearing according to one embodiment of the present disclosure.

FIG. 11 is a view showing the balancer housing and the bearing according to one embodiment of the present disclosure.

As exemplarily shown in FIG. 11, the bearing 250 is configured to come into contact with the inner surface of the balancer housing 110.

In the present embodiment, the bearing 250 is a friction bearing. As the bearing 250 comes into contact with the inner surface of the balancer housing 110, the bearing 250 serves not only to restrict a movement range of the balancing module 200, but also to prevent the balancing module 220 from colliding with the inner surface of the balancer housing 110.

A surface of the bearing 250 includes contact ridges 251 and valleys 252 between the ridges 251. That is, the surface of the bearing 250 has a corrugated cross section.

The valleys 252 permit impurities present inside the balancer housing 110 to pass through the valleys 252, or cause the impurities to accumulate in the valleys 252, which may prevent the impurities from hindering movement of the balancing module 200.

In addition, the size of the contact ridges 251 may be adjusted to prevent the balancing module 200 from colliding with the surface of the balancer housing 110 and to allow the brushes 240 to come into contact with the electrodes 111 and 112 of the balancer housing 110 while maintaining a constant contact degree therebetween.

Figure 12:
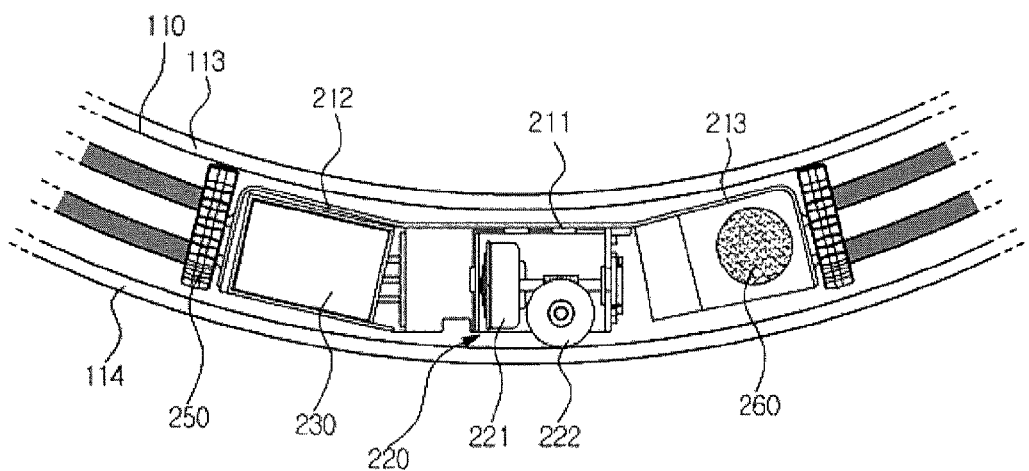
FIGS. 12 and 13 are views showing operation of the balancer within the balancer housing.
Figure 13:
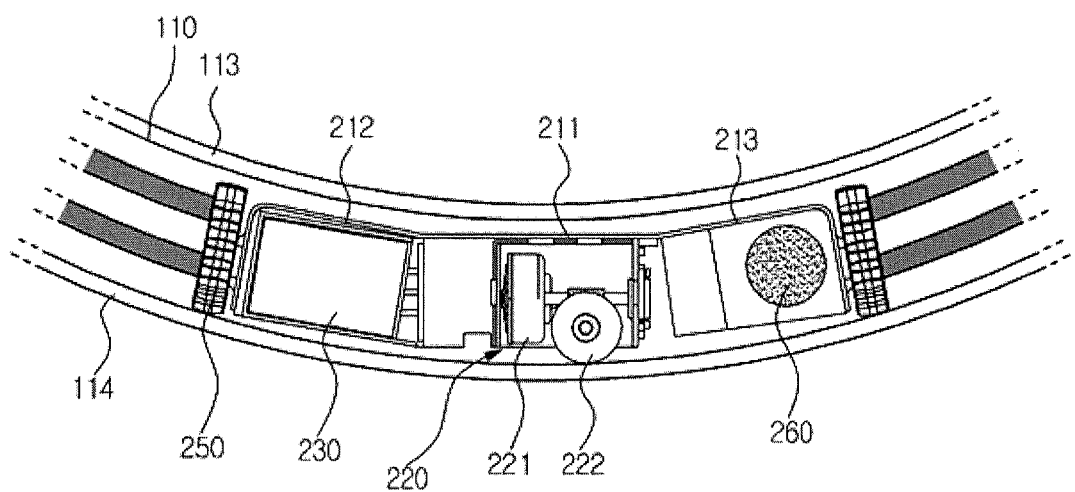

FIGS. 12 and 13 are views showing operation of the balancer within the balancer housing.

FIG. 12 is a view showing a state of the balancing module 200 when the rotating basket (30, see FIG. 1) is rotated at a low speed or stops rotating.

As exemplarily shown in FIG. 12, the main plate 210 of the balancing module 200 maintains an original state thereof. Thus, the center plate 211 maintains a predetermined angle with respect to the lateral plates 212 and 213.

Thereby, the bearings 250 mounted at the ends of the lateral plates 212 and 213 come into contact with a first surface 113 of the balancer housing 110. Here, the first surface 113 is a radially inwardly located surface among an inner surface of the balancer housing 110.

In this case, the drive wheels 222 come into contact with a second surface 114 of the balancer housing 110 that is a radial outwardly located surface among the inner surface of the balancer housing 110.

In this way, the drive wheels 222 apply pressure to the second surface 114.

FIG. 13 is a view showing a state of the balancing module 200 when the rotating basket (30, see FIG. 1) is rotated at a high speed.

As exemplarily shown in FIG. 13, the angle between the center plate 211 and the lateral plates 212 and 213 is greater than that in the stationary state under influence of centrifugal force. That is, the lateral plates 212 and 213 radially spread.

As the lateral plates 212 and 213 spread, both the bearings 250 and the drive wheels 222 come into contact with the second surface 114.

Thereby, the pressure applied to the drive wheels 222 is reduced, causing the drive wheels 222 to rotate more freely.

Through free movement of the drive wheels 222, the balancing module 200 may be more easily moved to a desired position by the drive wheels 222.

That is, a wider movement range of the balancing module 200 is achieved during high-speed rotation of the rotating basket 30, which allows the balancing module 200 to be moved to a position suitable to more rapidly alleviate load unbalance of the rotating basket 30.

Figure 14:
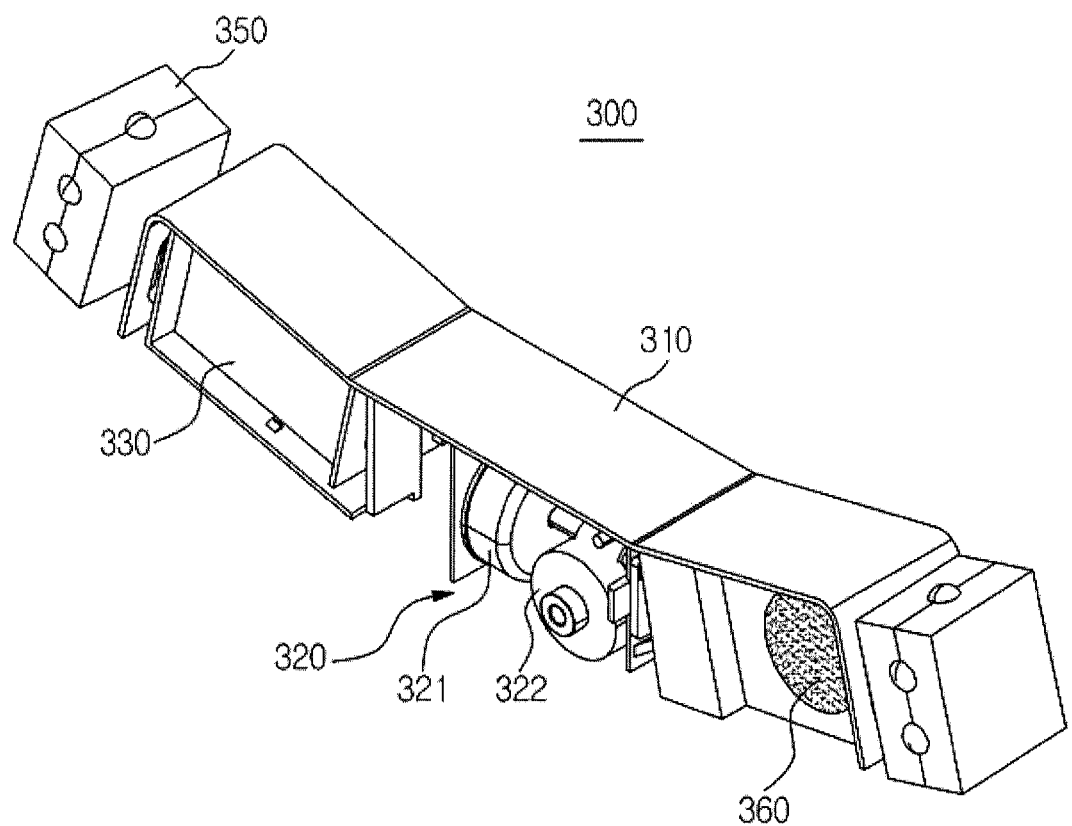
FIG. 14 is a view showing a balancing module according to another embodiment of the present disclosure.

FIG. 14 is a view showing a balancing module according to another embodiment of the present disclosure.

As exemplarily shown in FIG. 14, the balancing module 300 may include a main plate 310 that defines a basic shape of the balancing module 300.

A mass body (not shown) may be mounted to the main plate 310. In addition, a drive unit 320 may be mounted to the main plate 310. The mass body (not shown) may be provided with a circuit board 230 and a position identifier 360.

The drive unit 320 may include drive wheels 322 to enable self-movement of the balancing module 300, and a drive motor 321 to rotate the drive wheels 322.

Bearings 350 may be mounted to both ends of the main plate 310.

In the present embodiment, the bearings 350 may be ball bearings.

The bearings 350 in the form of ball bearings according to the present embodiment may ensure easy movement of the balancing module 300 within the balancer housing (110, see FIG. 3).

Figure 15:
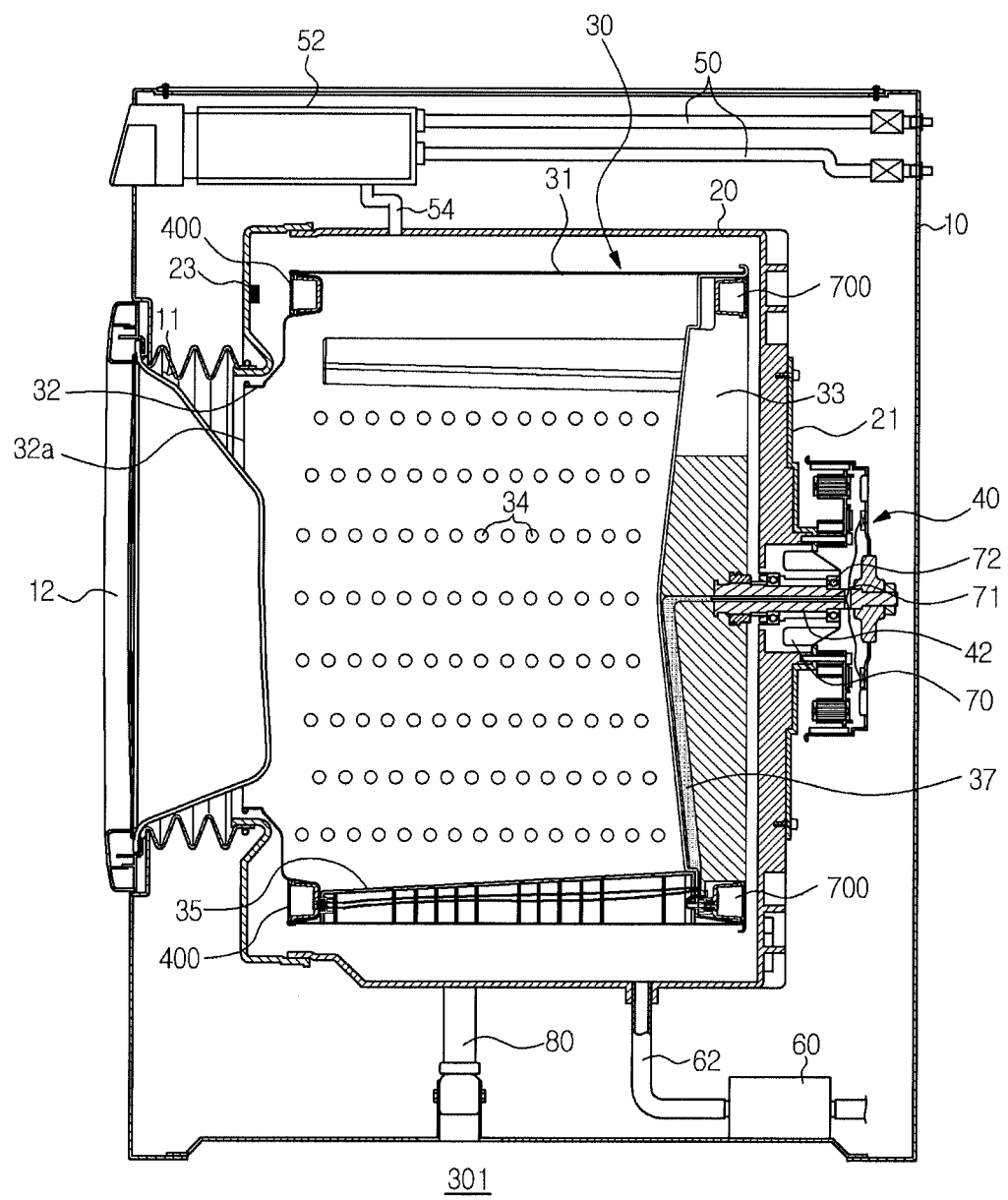
FIG. 15 is a view showing a configuration of a washing machine according to another embodiment of the present disclosure.
Figure 16:
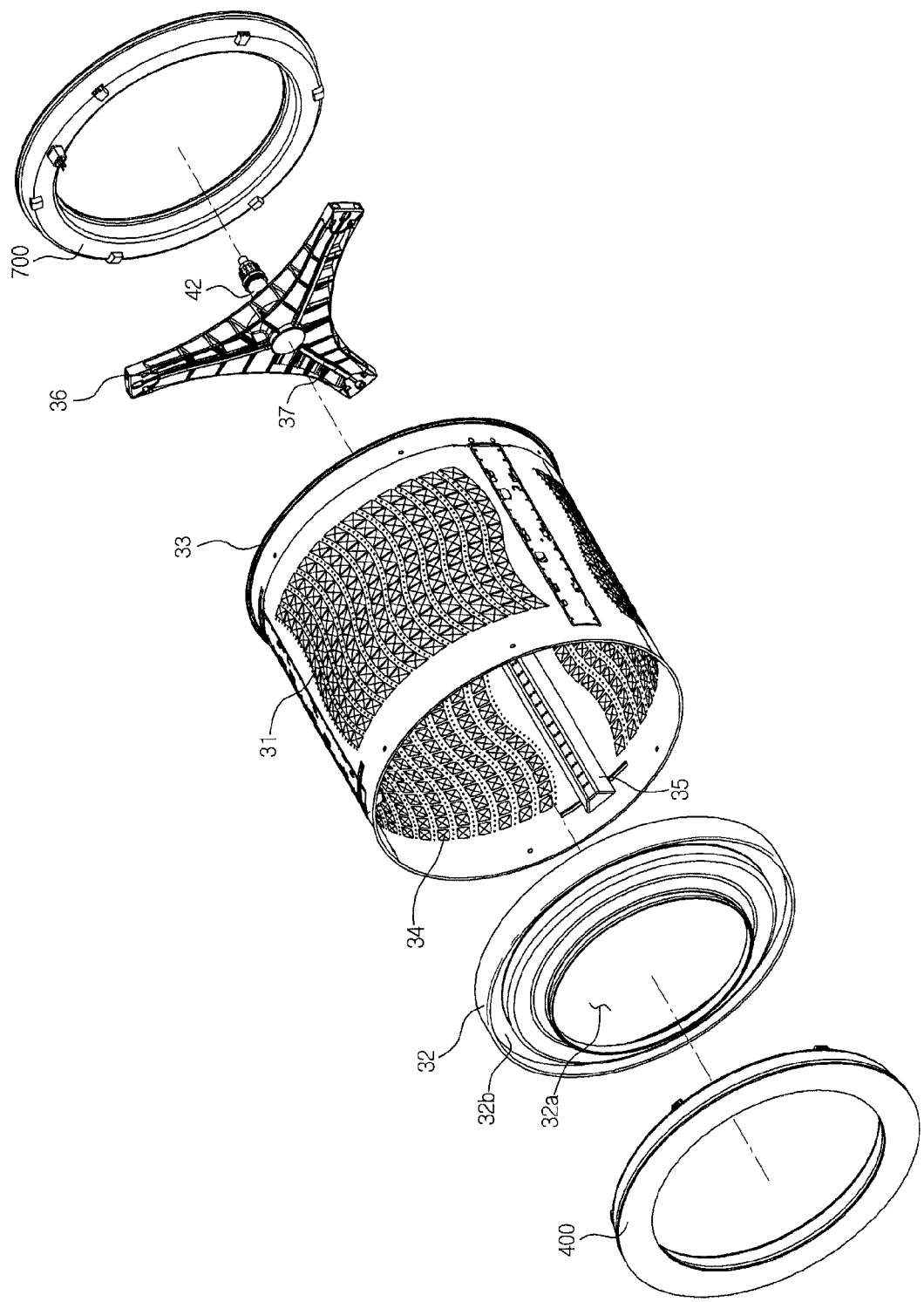
FIG. 16 is a view showing a configuration of the rotating basket provided in the washing machine of FIG. 1.
Figure 17:
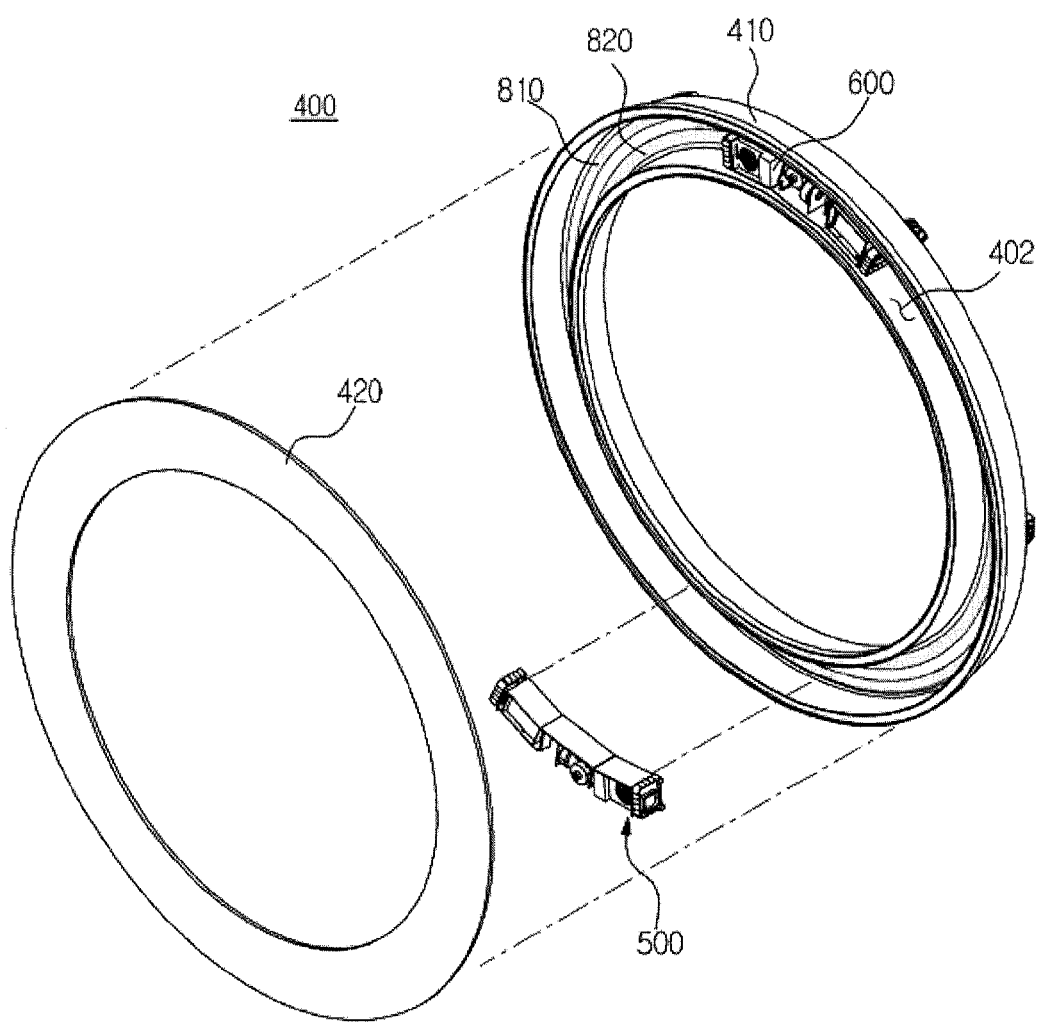
FIG. 17 is a view showing a balancer according to another embodiment of the present disclosure.
Figure 18:
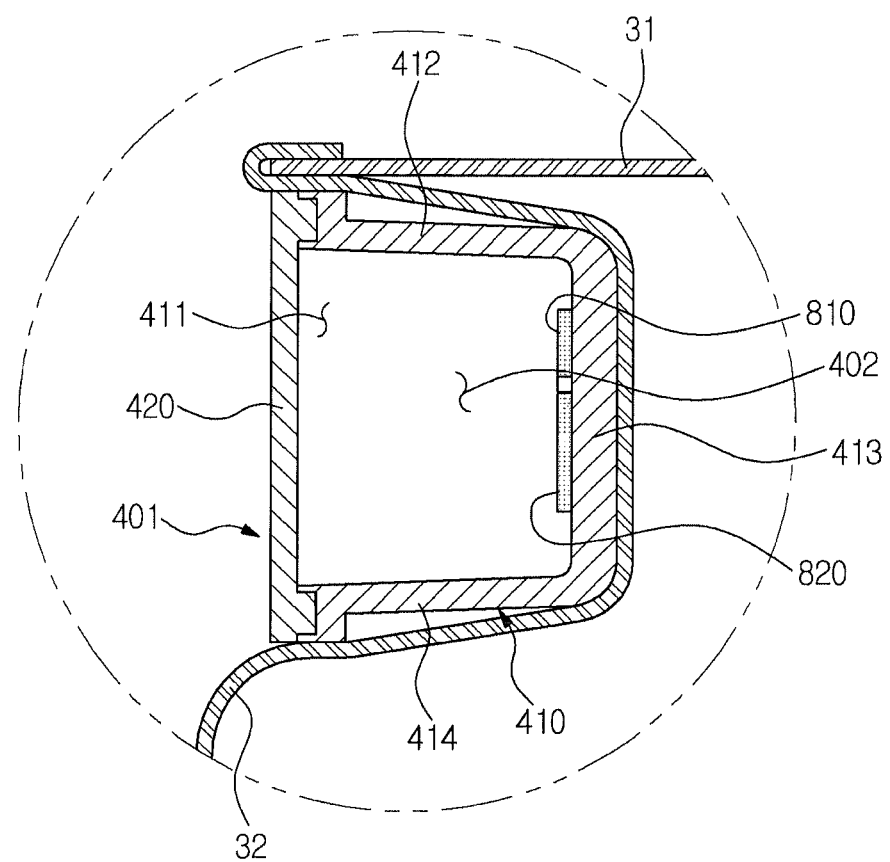
FIG. 18 is a sectional view taken along a cut line of FIG. 16.
Figure 19:
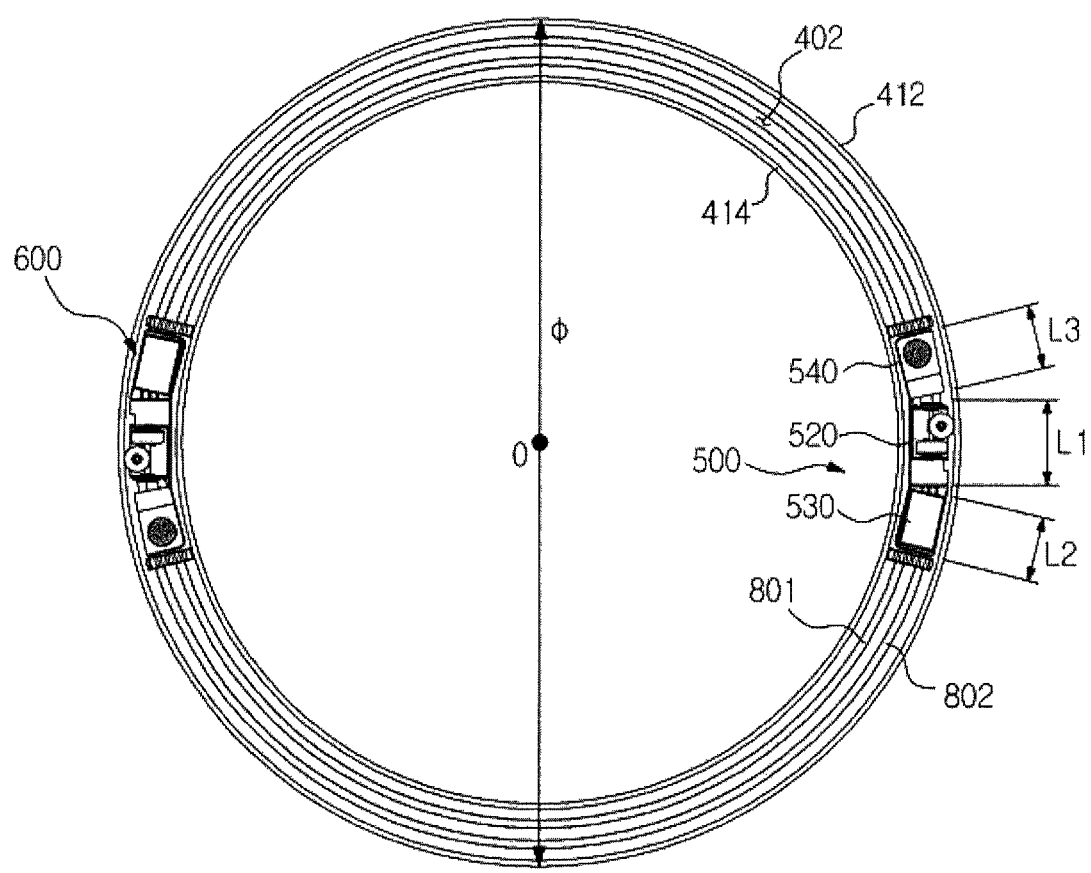
FIG. 19 is a front sectional view of the balancer of FIG. 17.
Figure 20:
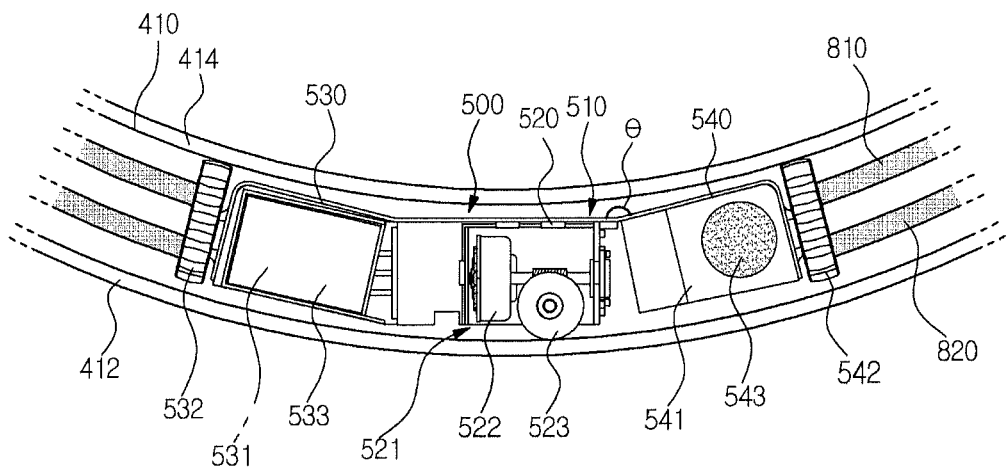
FIG. 20 is an enlarged view of a balancing module of the balancer of FIG. 17.

FIG. 15 is a view showing a configuration of a washing machine according to another embodiment of the present disclosure, and FIG. 16 is a view showing a configuration of the rotating basket provided in the washing machine of FIG. 1. FIG. 17 is a view showing a balancer according to another embodiment of the present disclosure, FIG. 18 is a sectional view taken along a cut line of FIG. 16, FIG. 19 is a front sectional view of the balancer of FIG. 17, and FIG. 20 is an enlarged view of a balancing module of the balancer of FIG. 17.

A configuration of the washing machine according to another embodiment of the present disclosure will be described hereinafter with reference to FIGS. 15 to 20. The same components as those of the above-described embodiment are designated by the same reference numerals and a description thereof will be omitted.

The washing machine 301 according to the present embodiment includes balancers 400 and 700 to alleviate load unbalance caused during rotation of the rotating basket 30.

The balancers 400 and 700 include the balancer 400 provided at the front side of the rotating basket 30 and the balancer 700 provided at the rear side of the rotating basket 30.

Although the washing machine 301 of the present embodiment includes both the front balancer 400 and the rear balancer 700, the embodiment is not limited thereto, and the washing machine 301 may include any one of the front balancer 400 and the rear balancer 700.

The front balancer 400 and the rear balancer 700 have symmetrical configurations. Hereinafter, only the configuration of the front balancer 400 will be described, and a description of the rear balancer 700 will be omitted.

The balancer 400 is inserted into a balancer mounting groove (32b, see FIG. 16) formed in a circumferential rim of the front plate 32. Although not shown, the balancer 400 inserted into the balancer mounting groove 32b may be firmly coupled to the rotating basket 30 via fastening members, such as screws.

The balancer 400 includes a balancer housing 401 having an annular channel 402, and balancing modules 500 and 600 movably disposed in the annular channel 402 of the balancer housing 401 to alleviate load unbalance caused during rotation of the rotating basket 30.

The balancer housing 401 may be formed by coupling a first housing 410 and a second housing 420 to each other.

As well shown in FIG. 18, the first housing 410 may have an approximately U-shaped cross section. That is, the first housing 410 may include an opening 411, an outer sidewall 412, an inner sidewall 414 arranged to face the outer sidewall 412 at a position closer to a rotation axis (O, see FIG. 19) of the rotating basket 30 than the outer sidewall 412, and a connection wall 413 connecting the outer sidewall 412 and the inner sidewall 414 to each other.

In this case, the connection wall 413 is located closer to the center of the rotating basket 30 than the opening 411. As such, in the case of the front balancer 400, the connection wall 413 of the first housing 410 is located behind the opening 411. Of course, in the case of the rear balancer 700, this configuration is reversed.

The outer sidewall 412 may receive pressure from the balancing modules 500 and 600 by centrifugal force during rotation of the rotating basket 30.

The second housing 420 may be inserted into the opening 411 of the first housing 410 to define the annular channel 402 along with the first housing 410. The first housing 410 and the second housing 420 may be thermally fused to each other.

As described above, the reason why the first housing 410 having an approximately U-shaped form is mounted to the rotating basket 30 such that the connection wall 413 thereof is located closer to the center of the rotating basket 30 than the opening 411 is that this configuration is more advantageous to increase an inner space of the rotating basket 30 than in the reverse configuration.

This is because a distance between the outer sidewall 412 and the inner sidewall 414 may be gradually increased from the connection wall 413 toward the opening 411 due to the nature of a mold upon injection molding of the first housing 410 having an approximately U-shaped form.

Electrodes 810 and 820 are provided in a circumferential direction of the balancer housing 401 to transmit power to the balancing modules 500 and 600 disposed in the annular channel 402 of the balancer housing 401.

In this case, the electrodes 810 and 820 may be arranged on an inner surface of the connection wall 413 of the first housing 410. This is because maximizing a distance between the electrodes 810 and 820 and the position sensor (23, see FIG. 15) mounted to the tub 20 to minimize interference therebetween may be advantageous.

The balancing module 500 and the balancing module 600 may be movably disposed in the annular channel 402 of the balancer housing 401. Here, the module 500 and the balancing module 600 have the same configuration, and therefore in the following description, only the balancing module 500 will be described, and a description of the balancing module 600 will be omitted.

As shown in FIG. 20, the balancing module 500 includes a metallic main plate 510. The main plate 510 includes a center plate 520 and a plurality of lateral plates 530 and 540 provided at both sides of the center plate 520.

The respective lateral plates 530 and 540 are bent relative to the center plate 520 and have a predetermined angle with respect to the center plate 520.

The center plate 520 is provided with a drive unit 521 to enable movement of the balancing module 500. The drive unit 521 includes a drive motor 522 to generate power, and drive wheels 523 to be rotated by power of the drive motor 522.

The lateral plates 530 and 540 are respectively provided with mass bodies 531 and 541 to alleviate unbalanced load of the rotating basket 30 and bearings 532 and 542 to prevent slip of the balancing module 500. Although the bearings 532 and 542 are coupled to the lateral plates 530 and 540 in the present embodiment, the embodiment is not limited thereto, and the bearings 532 may be directly coupled to the mass bodies 531 and 541.

The lateral plate 530 may be provided with a circuit board 533 to control driving of the balancing module 500. The lateral plate 540 may be provided with a position identifier 543 that interacts with the position sensor 23 mounted to the tub 20.

The main plate 510 is elastically deformable such that the angle between the center plate 520 and the lateral plates 530 and 540 is variable. In particular, the main plate 510 is elastically deformable by centrifugal force caused during rotation of the rotating basket 30.

That is, the main plate 510 is elastically deformed such that the angle between the center plate 520 and the lateral plates 530 and 540 is increased by centrifugal force applied to the mass bodies 531 and 541 of the lateral plates 530 and 540 during rotation of the rotating basket 30. Then, when the rotating basket 30 stops rotating and centrifugal force applied to the mass bodies 531 and 541 of the lateral plates 530 and 540 is eliminated, the main plate 510 is elastically returned to an original state thereof.

Accordingly, as the shape of the main plate 510 is changed according to a rate of rotation of the rotating basket 30, the role of the bearings 532 and 542 provided at the lateral plates 530 and 540 varies.

More specifically, when the rotating basket 30 stops rotating or when the rotating basket 30 is rotated at a low speed of about 50-500 RPM, low centrifugal force is applied to the mass bodies 531 and 541. In this case, the bearings 532 and 542 of the lateral plates 530 and 540 come into contact with the inner sidewall 414 of the first housing 410 to apply and receive pressure to and from the inner sidewall 414. In this way, the bearings 532 and 542 may prevent slip of the balancing module 500.

When the speed of the rotating basket 30 is gradually increased and the rotating basket 30 is rotated at a middle speed, centrifugal force applied to the mass bodies 531 and 541 is increased. As such, the angle between the center plate 520 and the lateral plates 530 and 540 may be increased, which causes the bearing 532 and 542 to be spaced apart from the sidewall 414 of the first housing 410.

When the speed of the rotating basket 30 is further increased and the rotating basket 30 is rotated at a high speed of about 1300 RPM, centrifugal force applied to the mass bodies 530 and 540 is further increased. As such, the angle between the center plate 520 and the lateral plates 530 and 540 is further increased, which causes the bearings 532 and 542 to come into contact with the outer sidewall 412 of the first housing 410.

Thereby, load applied to the drive wheels 523 may be distributed over the bearings 532 and 542, and the drive wheels 423 may be free of damage due to overload applied to the drive wheels 523 during high-speed rotation of the rotating basket 30.

Standards of the main plate 510 and the mass bodies 531 and 541 may be freely designed so long as the above-described effects may be achieved, and are not in any way limited.

In one example, assuming that a diameter $\phi$ of the rotating basket 30 is in a range of 500~600 mm, a length of the main plate 510 (L1+L2+L3) may be in a range of about 160~170 mm. An angle $\theta$ between the center plate 520 and the lateral plate 530 may be in a range of about 163~165 degrees when the rotating basket 30 stops. The sum of a mass of the mass body 531 and a mass of the mass body 541 of one balancing module 500 may be in a range of about 400~500 grams.

As is apparent from the above description, it may be possible to rapidly alleviate load unbalance of a rotating basket through active movement of a balancer module disposed within a balancer housing.

It may be possible to transmit power of an external power source to the balancer module via a simplified configuration.

Although the embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
   a rotating basket in which laundry is accommodated, the rotating basket being configured to be rotated upon receiving rotation power from a drive source;
   at least one balancer housing mounted to the rotating basket, the balancer housing internally having an annular channel, the balancer housing includes at least one electrode provided in a circumferential direction of the balancer housing and configured to transmit electric power from an external power source; and
   at least one balancing module movably disposed in the channel to alleviate load unbalance caused during rotation of the rotating basket,
   wherein the balancing module includes
      a main plate;
      at least one mass body provided at the main plate;
      a drive unit mounted to the main plate to assist the balancing module in moving to a position where the balancing module alleviates load unbalance of the rotating basket;
      a brush configured to transmit the electric power to the drive unit, the brush being placed behind the drive unit to come into physical contact with the at least one electrode; and
      bearings mounted at both ends of the balancing module, the bearings being configured to prevent the main plate and the at least one mass body from coming into contact with an inner surface of the balancer housing,
   wherein each of the bearings includes a circumferential surface configured to come into contact with the inner surface of the balancer housing, the circumferential surface having a corrugated cross section including contact ridges and valleys.

2. The washing machine according to claim 1, wherein the main plate is bent so as to freely move within the annular channel.

3. The washing machine according to claim 2, wherein the main plate includes a center plate, and a first lateral plate and a second lateral plate provided at both sides of the center plate so as to be bent relative to the center plate, the first and second lateral plates having a predetermined angle with respect to the center plate.

4. The washing machine according to claim 1, wherein the drive unit includes a drive motor to generate drive power, and a drive wheel to be rotated by drive power of the drive motor so as to enable movement of the balancing module.

5. The washing machine according to claim 4, wherein the drive unit further includes at least one gear configured to transmit drive power of the drive motor to the drive wheel.

6. The washing machine according to claim 5, wherein the at least one gear includes a worm gear.

7. The washing machine according to claim 5, wherein the at least one gear includes a helical gear.

8. The washing machine according to claim 1, further comprising a position sensor configured to sense a position of the balancing module.

9. The washing machine according to claim 8, wherein the balancing module further includes a position identifier configured to be sensed by the position sensor.

10. The washing machine according to claim 1, wherein the balancer housing includes:
 a first housing having an opening, an outer sidewall, an inner sidewall arranged to face the outer sidewall at a position closer to a rotation axis of the rotating basket than the outer sidewall, and a connection wall connecting the outer sidewall and the inner sidewall to each other, the connection wall being located closer to the center of the rotating basket than the opening; and
 a second housing inserted into the opening of the first housing so as to define the annular channel along with the first housing.

11. The washing machine according to claim 10, wherein the at least one electrode is provided at an inner surface of the connection wall of the first housing.

12. The washing machine according to claim 10, wherein the main plate includes:
 a center plate provided with the drive unit; and
 a plurality of lateral plates provided at both sides of the center plate, each of the lateral plates being provided with the mass body and a bearing to prevent slip of the balancing module, and
 wherein the lateral plates are bent relative to the center plate and have a predetermined angle with respect to the center plate.

13. The washing machine according to claim 12, wherein the drive unit includes a drive motor to generate drive power and a drive wheel to be rotated by drive power of the drive motor, and
 wherein the drive wheel comes into contact with the outer sidewall of the first housing.

14. The washing machine according to claim 12, wherein the main plate is elastically deformable such that the angle between the center plate and the lateral plates varies.

15. The washing machine according to claim 14, wherein the main plate is elastically deformed such that the angle between the center plate and the lateral plates is increased by centrifugal force applied to the mass body of each lateral plate during rotation of the rotating basket, and is returned when the rotating basket stops rotating.

16. The washing machine according to claim 12, wherein the bearing comes into contact with the inner sidewall of the first housing, comes into contact with the outer sidewall of the first housing, or is spaced apart from the inner sidewall and the outer sidewall according to a rate of rotation of the rotating basket.

17. The washing machine according to claim 16, wherein the bearing comes into contact with the inner sidewall of the first housing when the rotating basket stops rotating or is rotated at a low speed.

18. The washing machine according to claim 16, wherein the bearing is spaced apart from the inner sidewall and the outer sidewall of the first housing when the rotating basket is rotated at a middle speed.

19. The washing machine according to claim 16, wherein the bearing comes into contact with the outer sidewall of the first housing when the rotating basket is rotated at a high speed.

* * * * *